United States Patent [19]
Lucas

[11] Patent Number: 4,735,262
[45] Date of Patent: Apr. 5, 1988

[54] ROTARY STEAM JOINT

[75] Inventor: James C. Lucas, Gastonia, N.C.

[73] Assignee: Duff-Norton Company, Charlotte, N.C.

[21] Appl. No.: 17,329

[22] Filed: Feb. 20, 1987

[51] Int. Cl.[4] ............................................. F28D 11/02
[52] U.S. Cl. ...................................... 165/89; 384/476; 384/900
[58] Field of Search .................. 165/89; 384/317, 320, 384/321, 476, 900; 169/90, 91

[56] References Cited

U.S. PATENT DOCUMENTS

| | | | |
|---|---|---|---|
| 1,928,173 | 9/1933 | Gerstenberg | 165/89 |
| 2,352,206 | 6/1944 | Kendall | 384/476 |
| 3,217,794 | 11/1965 | Meyer et al. | 165/89 |
| 3,449,839 | 6/1969 | Crist | 165/89 X |
| 4,051,604 | 10/1977 | Fleissner | 165/90 X |
| 4,154,446 | 5/1979 | Ussy | 384/317 X |
| 4,371,032 | 2/1983 | Buttner | 165/91 |
| 4,459,726 | 7/1984 | O'Brien et al. | 165/89 X |
| 4,602,874 | 7/1986 | Neugebauer | 384/476 |

FOREIGN PATENT DOCUMENTS 630792 10/1949 United Kingdom ............... 384/321

Primary Examiner—Albert W. Davis, Jr.
Assistant Examiner—Peggy Neils
Attorney, Agent, or Firm—Shefte, Pinckney & Sawyer

[57] ABSTRACT

A rotary joint for establishing supply and removal connections for flow of a working fluid between stationary external piping and the interior of a rotating drum, the joint including a stationary tubular shaft assembly about which a flanged housing is rotatably journaled, wherein a heat exchange chamber system is formed interiorly within the shaft assembly annularly thereabout and along the housing journals with a baffle within the chamber system for causing a heat exchange fluid to circulate throughout the annular and longitudinal extent of the chamber system thereby relieving the housing journals from any opposed heat exchange effects of the working fluid to enable high speed operation of the rotary joint at either relatively high or low temperatures.

31 Claims, 3 Drawing Sheets

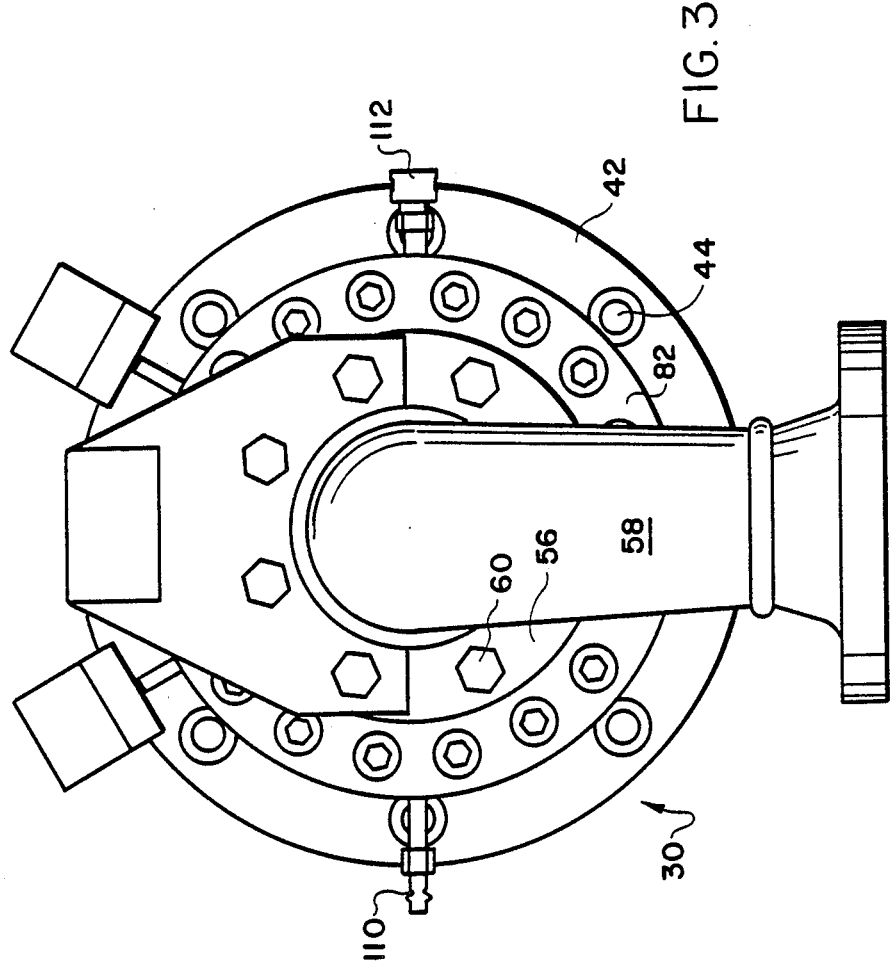

4,735,262

ROTARY STEAM JOINT

BACKGROUND OF THE INVENTION

The present invention relates generally to rotary joints for establishing fluid connections between stationary piping and a rotating drum. More particularly, the present invention relates to a rotary joint of such type having a heat exchange chamber system for relieving any heat exchange effects from the fluid supply.

Rotary joints of the above-described types have widely varying uses throughout industry. For example, in a traditional paper manufacturing process, a paper web once formed is directed in peripheral contact about one or more heated rotating drums to effectively dry or calendar the paper web. The drum characteristically is hollow with a smooth outer peripheral surface for carrying the paper web, the drum being interiorly heated to transfer drying or calendaring heat to the traveling paper web. Conventionally, a rotary joint is affixed sealably to one axial end of the drum to establish a supply connection and, if desired, a return connection for flow of a heated fluid between external piping and the drum interior. Such rotary joints basically include a main shaft assembly for connection with stationary external fluid supply piping and a housing member rotatably journaled annularly about the shaft assembly, with one of the shaft assembly and housing member being affixed to the drum for rotation therewith while the other is mounted to remain stationary. The shaft assembly may be further adapted to receive internally one end of an exhaust tube to establish appropriate communication with stationary external fluid return piping, as desired.

With increasing efforts in recent years to improve the efficiency and economy in paper making operations, it has been common to increase the speed of operation of calendar and dryer drums while at the same time utilizing heating fluids such as heat transfer oils or steam at increasing temperatures. Unfortunately, such increases in drum speed and operating temperature place a substantial strain on the journal components of the rotary joint and, over time, deleteriously affect their anti-friction operation and may ultimately cause their failure.

SUMMARY OF THE INVENTION

It is accordingly a principal object of the present invention to provide a rotary joint of the aforementiones types adapted for high speed operation at relatively high or low temperatures. It is a further object of the present invention to provide such a rotary joint with a novel internal chamber arrangement for effectively insulating and relieving the journal components of the joint from the working effects resulting from supply of relatively high or relatively low temperature working fluids to the associated rotary drum.

Briefly summarized, the rotary joint of the present invention basically includes a tubular shaft assembly adapted to be stationarily mounted exteriorly of a rotary drum at one axial end thereof, a rotary housing adapted for affixation in integral rotational relation with the drum, and a journal assembly supporting the housing rotatably about a longitudinal end portion of the shaft assembly. The shaft assembly defines a supply pathway for a working fluid and includes a fitting or other appropriate arrangement for communicating with the fluid supply pathway to admit a supply of the working fluid into the pathway. The shaft assembly further includes an arrangement defining a heat exchange chamber extending interiorly within the shaft assembly along at least the predominant length of its longitudinal end portion, the chamber having an access end extending beyond the longitudinal end portion of the shaft assembly outwardly from the housing. An inlet communicates with the access end of the chamber for admitting a supply of a heat exchange fluid into the chamber's access end to occupy the chamber in order to achieve effective heat exchange with respect to the journal assembly along substantially the full length of the longitudinal end portion of the shaft assembly, to relieve the journal assembly from any opposing heat exchange effects from the working fluid within the supply pathway.

In the preferred embodiment, the shaft assembly of the rotary joint includes a hollow body and a tubular support section extending therefrom to be disposed in facing relation to the tubular support journal of the drum coaxially with an axial opening through the journal to define the working fluid supply pathway. The housing is disposed concentrically about a predominant longitudinal end portion of the tubular support section of the shaft assembly and is adapted for affixation rigidly to the tubular support journal in integral rotary relation with the support journal and the drum. The journal assembly of the rotary joint is disposed intermediate the shaft assembly and the housing for supporting the housing for relative rotation about the longitudinal end portion of the tubular support section. The body may be arranged, if desired, to receive and support an exhaust tube to extend concentrically within the tubular support section of the shaft assembly and, as further desired, the body may be capable of rotatably supporting the exhaust tube for rotary operation. In such embodiments, the fluid supply pathway is defined annularly between the tubular support section of the shaft assembly and the exhaust tube.

Preferably, an outlet communicates with the chamber's access end for exhausting the heat exchange fluid therefrom and a baffle arrangement in the chamber defines a tortuous flow path for the heat exchange fluid through the chamber between the inlet and outlet for causing the heat exchange fluid to flow longitudinally within the chamber at least a substantial portion of its length. The heat exchange chamber is defined interiorly within the tubular support section of the shaft assembly and includes a main annular chamber area extending along substantially the entire length of the longitudinal end portion of the tubular support section with an access region of the chamber area extending beyond the longitudinal end portion axially outwardly from the housing. An exhaust passageway extends interiorly within the tubular support section from an access location beyond the longitudinal end portion axially outwardly from the housing out of communication with the main chamber area to a connecting location in communication with the main chamber area at a substantial spacing along the length of the longitudinal end portion of the tubular support section. The inlet communicates with the access region of the exhaust chamber area while the outlet fitting communicates with the access location of the exhaust passageway at the opposite sides of the tubular support section. In this manner, the main chamber area and the exhaust passageway cooperatively define a tortuous flow pathway to cause the heat exchange fluid to flow longitudinally a substantial portion of the length and annular extent of the chamber for effective heat exchange relation with the journal assembly. For high temperature operation of the joint, a fluid coolant is delivered into the inlet as the desired heat exchange fluid.

The tubular support section of the shaft assembly is preferably constructed of inner and outer tubular members affixed in concentric relation to one another to define the main chamber area between the tubular members, with the outer tubular member defining the exhaust passageway interiorly therethrough. The housing also preferably includes a plurality of exterior cooling fins for increasing the exposed exterior surface area of the housing for enhanced cooling thereof by ambient air.

BRIEF DESCRIPTION OF THE DRAWINGS

FIG. 3 is a left end elevational view of the present rotary joint of FIG. 2.

DESCRIPTION OF THE PREFERRED EMBODIMENT

Referring now to the accompanying drawings, the present invention will be described more fully hereinafter with reference to a preferred embodiment of the present invention illustrated therein. However, it is to be understood that the following description is intended only as a broad, teaching disclosure directed to persons of skill in the appropriate arts, and not as limiting upon the present invention. Persons of skill in the appropriate arts will recognize that the present invention herein described may be modified or adapted in other embodiments while still achieving the favorable results of the present invention and without departing from the substance and scope thereof.

Figure 1:
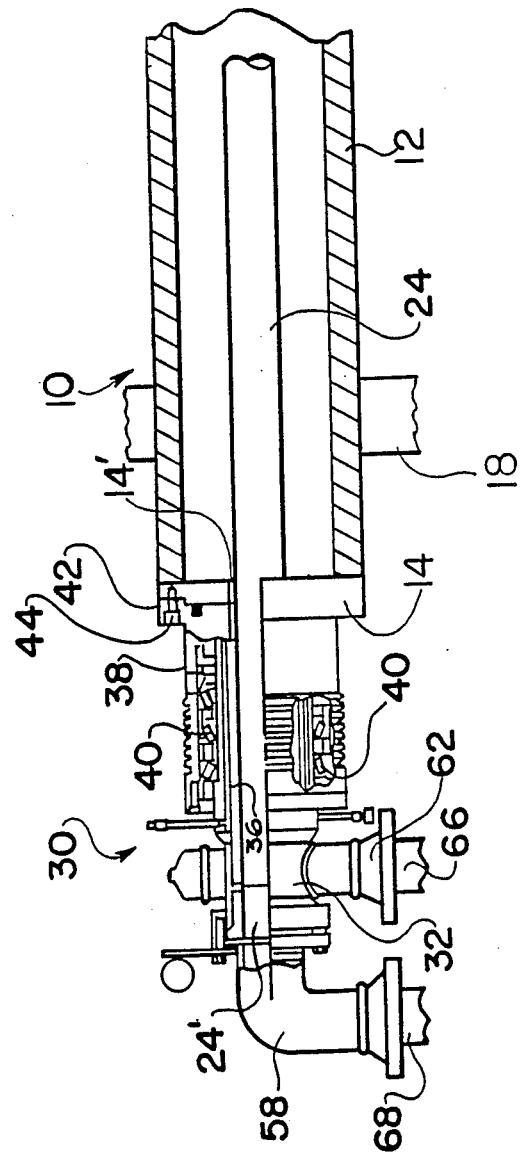
FIG. 1 is a vertical cross-sectional view showing the preferred embodiment of the rotary joint of the present invention installed in a rotary paper calendaring drum.

With reference first to FIG. 1, a calendar drum of the heretofore-described type adapted for continuously calendaring a traveling web, such as paper, plastic, rubber or the like, in a calendaring operation is generally indicated at 10. Only one end portion of the drum 10 is shown in FIG. 1 for succinctness of illustration, it being understood by those persons skilled in the appropriate arts that the drum 10 is of an essentially mirror-image construction at its opposite end. The drum 10 is of an essentially conventional construction including a relatively thickwalled hollow cylindrical body 12 to the opposite ends of which are affixed a pair of end caps 14, at least one of which is annular in configuration with a circular opening 14' therethrough at its center coaxial with the cylindrical body 12 for admitting a supply of a suitable heated working fluid, such as steam or a heat transfer oil, into the hollow interior of the calendar drum 10 during its operation. As desired, an exhaust tube member 24 of a smaller diameter may be positioned coaxially within the opening 14' to extend into the hollow drum interior for withdrawal of the heated working fluid. The opposite ends of the cylindrical body are respectively supported rotatably in a pair of suitable bearings, representatively indicated only at 18, to permit rotational operation of the drum 10.

Figure 2:
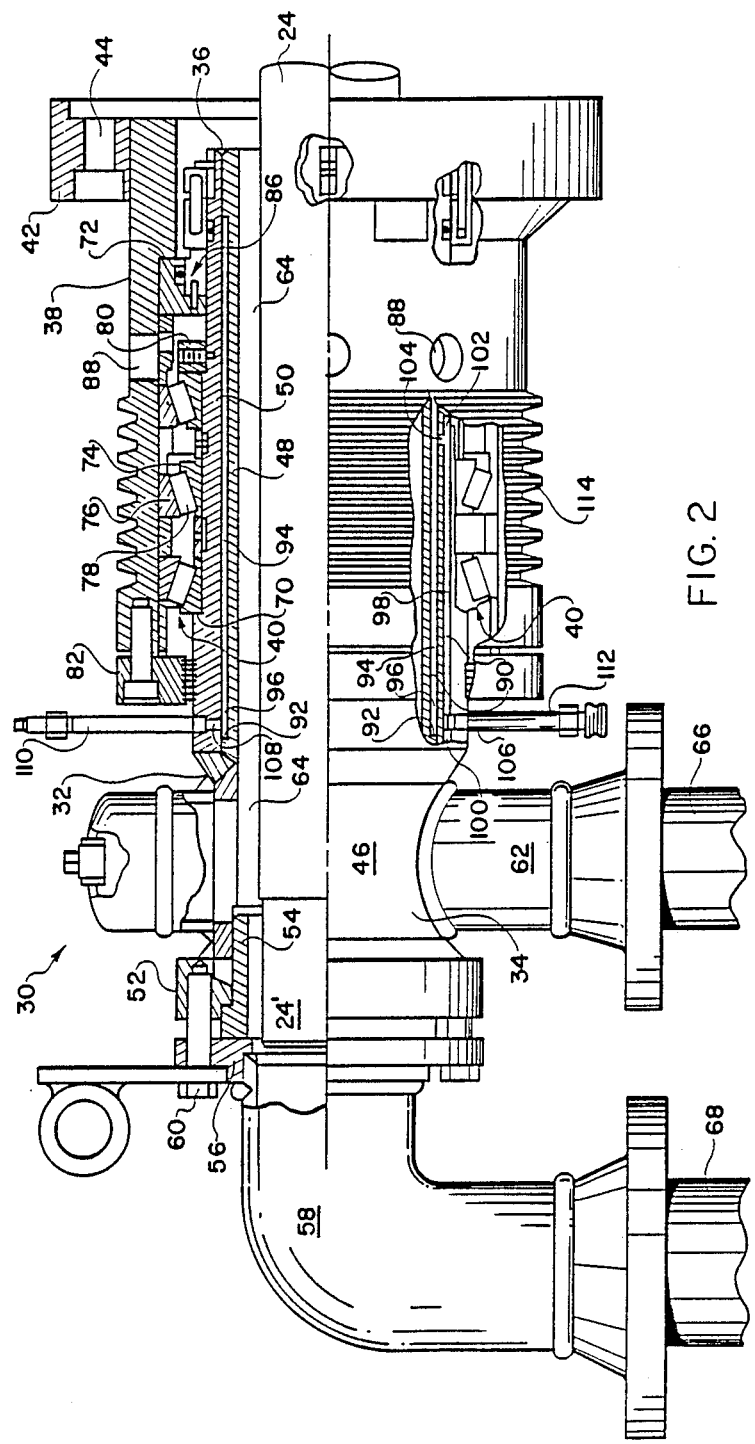
FIG. 2 is a detailed view partly in side elevation and partly in vertical cross-section of the components of the rotary joint of the present invention shown in FIG. 1.

The rotary joint of the present invention is indicated generally at 30 in FIG. 1 and is shown in greater enlarged detail in FIGS. 2 and 3. Basically, the rotary joint 30 includes a main shaft assembly 32 having a hollow body 34 and a tubular support section 36 extending therefrom and a flanged housing member 38 rotatably disposed concentrically about the predominant portion of the length of the tubular support section 36 along its free outward longitudinal end by a journal assembly, indicated generally at 40, disposed intermediate the tubular support section 36 and the housing 38. The shaft assembly 32 is mounted stationarily adjacent the exterior axial end of the annular end cap 14 with the tubular support section 36 in end facing relation to the annular end cap 14 coaxial with its axial opening 14'. The housing member 38 includes an end flange 42 by which the housing member 38 is bolted at 44 to the outward radial end face of the annular end cap 14 to rotate integrally with the drum 10.

The body 34 includes a tubular cylindrical body section 46 defining a cylindrical interior area. The tubular support section 36 includes inner and outer cylindrical members 48,50 defining an interior cylindrical area of corresponding diameter to the cylindrical body section 46, the cylindrical members 48,50 being welded in concentric relation to one another and in coaxial end abutting relation to the cylindrical body section 46. A circular end flang ring 52 is welded in coaxial end abutting relation to the opposite end of the cylindrical body section 46 and includes a circular recessed area 52' at the radially inward edge of the outward axial face of the end flange ring 52 for receipt of a flanged cylindrical bearing assembly 54 fitted concentrically within the cylindrical body section 46 and the end flange ring 52. A compression flange 56 having a tubular elbow fitting member 58 welded coaxially therewith is bolted at 60 to the end flange ring 52 in coaxial relation therewith to retain the bearing assembly 54 in its described disposition. As will thus be understood, the housing body 34 is adapted to sealably receive and support an outward end 24' of the exhaust tube member 24 coaxially within the bearing assembly 54 and extending coaxially through the body section 46 and the cylindrical members 48,50.

Another tubular fitting member 62 is welded to the outer periphery of the cylindrical body section 46 and opens thereinto in communication with the annular interior area 64 of the shaft assembly 32 defined between the inner cylindrical surfaces of the body section 46 and the inner cylindrical member 48 and the outer periphery of the exhaust tube member 24. The tubular fitting 62 is connected through suitable piping 66 with a conventional pressurized source of the desired heated working fluid for delivering the fluid into the annular area 64 for delivery into the interior of the calendar drum 10. Similarly, the elbow fitting 58 is connected through suitable piping 68 connected to the fluid source or another suitable fluid collection location for fluid withdrawal from the drum interior through the exhaust tube member 24 under the effect of the naturally prevailing pressure differential between the drum interior and the exhaust tube member 24.

The peripheral surface of the outer cylindrical member 50 of the tubular support section 36 and the facing inner cylindrical surface of the housing member 38 are compatibly recessed at 70 and 72, respectively, defining an annular journal area therebetween within which the journal assembly 40 is disposed. The journal assembly 40 is of a conventional construction basically including inner and outer annular bearing rings 74, 76, respectively, arranged in essentially concentric radially-spaced relation defining journal raceways therebetween within which a plurality of roller journals 78 are captured, thereby to facilitate relative rotation of the inner and outer bearing rings 74,76. A retaining member 80 affixed by a set screw to the outer periphery of the cylindrical member 50 serves to retain the inner bearing rings 74 within the recessed area 70 of the outer cylindrical member 50 in fixed relation thereto. Similarly, a retaining flange member 82 is bolted to the outward end face of the housing member 38 to retain the outer bearing rings 76 within the recessed area 72 of the housing member 38 in fixed relation thereto. The journal area between the housing member 38 and the outer cylindrical member 50 of the tubular support section 36 is sealably closed from the annular area 64 by an appropriate seal assembly, indicated generally at 86, retained within the opposite end of the recessed area 72 of the housing member 38 in sealing relation therewith and affixed to the adjacent peripheral surface of the outer cylindrical member 50 in sealing relation therewith. Lubrication relief openings 88 are formed through the housing member 38 at spacings circumferentially thereabout into the journal area to permit relief of excess lubricant from the journal area of the journal assembly 40.

According to the present invention, the tubular support section 36 is formed internally with a heat exchange chamber, indicated generally at 90, which may be occupied by an appropriate heat exchange fluid for counteracting the heat exchange effects that the working fluid supplied through the shaft assembly 32 may have on the journal assembly 40 during operation. The outer periphery of the inner cylindrical member 48 of the tubular support section 36 is profiled by a recess 94 annularly about the inner cylindrical member 48 for substantially its entire length to define a main annular chamber area 94 of the heat exchange chamber 90 between the inner and outer cylindrical members 48,50. The main chamber area 94 extends axially within the tubular support section 36 along the entire axial extent of the journal area and axially further beyond the opposite axial ends of the journal area, including an access region 96 of the main chamber area 94 axially outwardly beyond the housing member 38 and its retaining flange member 82. The heat exchange chamber 90 also includes an exhaust passageway 98 extending interiorly within the outer cylindrical member 50 axially from an access end 100 located axially outwardly beyond the housing member 38 and its retaining flange 82 adjacent but out of communication with the access region 96 of the main chamber area 94 to a connecting end location 102 whereat a radial connecting passageway 104 provides communication between the passageway 98 and the main chamber area 94 at a substantial axial spacing along the outer cylindrical member 50 from the access end location 100. A radial threaded bore 106 is formed through the outer cylindrical member 50 closely adjacent the cylindrical body section 46 into communication with the access end location 100 of the passageway 98, with a similar threaded radial bore 108 being formed through the outer cylindrical member 50, also at a location closely adjacent the cylindrical body section 46 but at a 180 degree spacing circumferentially from the bore 106, to open into communication with the access region 96 of the main chamber area 94. A tubular fitting 110 is threadedly received within the bore 108 and is connected with a suitable source of heat exchange fluid for directing the fluid into the access region 96 and therefrom into the main chamber area 94. Similarly, a tubular fitting 112 is threadedly received within the bore 106 for exhausting the heat exchange fluid through the passageway 98 and transmitting the exhausted fluid to an appropriate collection location.

As will be understood, substantially any appropriate heat exchange fluid, either liquid or gaseous, may be utilized for circulation through the heat exchange chamber system 90. Either air or water are considered preferable, however, since these fluids are readily and inexpensively available. In the described embodiment of the rotary joint 30 with the calendar drum 10, air is utilized as the heat exchange fluid and may be chilled to a suitably lower temperature than the working fluid to provide an insulating and cooling effect on the journal assembly 40 to relieve and counteract the heating effect of the heated working fluid. For example, the air supply may be preferably chilled to a temperature of approximately 60 degrees Fahrenheit or lower and is conveyed through the heat exchange chamber system 90 at a flow rate of 20 SCFM when operating at working fluid temperatures of 300 degrees Fahrenheit or higher, although in many situations utilizing a high temperature working fluid, air at ordinary room temperature may be effectively utilized for cooling without further chilling. Of course, those persons skilled in the appropriate arts will readily recognize that other heat exchange fluids, temperatures and flow rates may also be effectively employed. Further, those persons skilled in the appropriate arts will recognize that the rotary joint 30 is susceptible of a substantially broader application and may be embodied in substantially any fluid flow system requiring fluid connection between stationary piping and a rotating member. Further in this regard, virtually any suitable heat exchange fluid, either heated or cooled, may be employed in the heat exchange chamber system 90 for relieving and counteracting any opposing heat exchange effects which a cooled or heated working fluid being supplied through the rotary joint may have on the journal assembly 40. In fact, in a wide variety of embodiments of the rotary joint 30 involving both heated and cooled working fluids, the heat exchange chamber system 90 will provide advantageous heat exchange results without utilizing any particularly cooled or heated heat exchange fluid and without providing any forced positive flow of fluid through the heat exchange chamber system 90 simply by opening the inlet and outlet fittings 110,112 to the ambient atmosphere to permit ordinary ambient air to occupy the chamber system 90.

In operation of the rotary joint 30, the shaft assembly 32 remains stationary while the housing member 38 and the exhaust tube member 24 rotate integrally with the calendar drum 10 and its end cap 14. Steam or heat transfer oil, or any other appropriate heated working fluid is continuously supplied through the fitting 62 into the annular working fluid supply area 64 of the shaft assembly 32 from which the working fluid is transmitted into the interior of the calendar drum 10 while simultaneously the working fluid within the calendar drum 10 is withdrawn through the exhaust tube member 24. As will be understood, the continuing rotation of the housing member 38 coupled with the heat generated by the heated working fluid passing through the annular supply pathway 64 serve to substantially heat the lubricant and the journal assembly 40 contained within the journal area. Under conditions of high temperature working fluid application together with high speed operation of the calendar drum 10, the heat thusly generated can break down the lubricant and create a significant strain and danger of possible damage of the journal assembly 40. The heat exchange chamber 90 prevents this occurrence by continuously circulating a coolant fluid through the main chamber area 94 and exhausting the coolant outwardly through the exhaust passageway 98 to insulate the journal assembly 40 from conduction heating by the working fluid passing through the annular housing area 64 and to further apply a cooling effect to the journal assembly 40 to counteract and relieve the heating effects of the working fluid and continuing rotary operation. Importantly, the particular arrangement of the exhaust passageway 98 serves as a baffle to insure that the fluid coolant is caused to flow longitudinally substantially the full axial length and annular extent of the main chamber area 94 before being exhausted throuth the exhaust passageway 98 in order to achieve a reasonably uniform cooling effect on the journal assembly 40 throughout the entire main chamber area 94. Particularly, the disposition of the housing member 38 about substantially the entire longitudinal end section of the shaft assembly 32 formed by the tubular support section 36 restricts access through the tubular support section 36 to the main chamber area 94 and the exhaust passageway 98 to their respective access locations 96,100. The baffle effect achieved by the disposition of the passageway 98 at a 180 degree spacing from the entrance bore 108 and the location of communication between the passageway 98 and the main chamber area 94 at a substantial axial spacing from the access region 96 of the main chamber area 94 prevents the fluid coolant from flowing directly between the inlet and exhaust bores 106, 108 to insure as aforementioned that the coolant fluid fully and uniformly occupies the main chamber area 94. In this manner, the described heat exchange chamber system enables the rotary joint 30 to effectively operate under extreme conditions of high (or low) working fluid temperatures and high rotational speeds without significant risks of failure of the journal assembly 40. As an additional cooling feature, the housing member 38 has a plurality of radially-projecting annular fins 114 formed at spacings along the outer periphery of the housing member 38 to provide the housing member 38 with increased exposed exterior surface area to enhance natural cooling of the housing member 38 by ambient air.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A rotary joint for establishing a fluid supply connection between stationary piping and a rotating drum, said rotary joint comprising:
   (a) shaft means adapted to be stationarily mounted exteriorly of said drum at one axial end thereof;
   (b) housing means adapted for affixation in integral rotary relation with said drum; and
   (c) journal means supporting said housing means rotatably about a longitudinal end portion of said shaft means;
   (d) said shaft means having:
      (1) means defining a supply pathway for a working fluid,
      (2) means communicating with said fluid supply pathway for admitting a supply of the working fluid into said fluid supply pathway,
      (3) means defining a heat exchange chamber extending interiorly within said shaft means along at least the predominate length of its said longitudinal end portion, said heat exchange chamber having an access end extending beyond said longitudinal end portion of said shaft means outwardly from said housing means, and
      (4) inlet means communicating with said access end of said heat exchange chamber for admitting a supply of a heat exchange fluid into said access end of said heat exchange chamber to occupy said heat exchange chamber, to achieve effective heat exchange with respect to said journal means along substantially the full length of said longitudinal end portion of said shaft means for relieving said journal means from any opposing heat exchange effects of the working fluid within said supply pathway.

2. A rotary joint according to claim 1 and characterized further in that said shaft means includes outlet means communicating with said access end of said heat exchange chamber for exhausting said heat exchange fluid from said access end of said heat exchange chamber.

3. A rotary joint according to claim 2 and characterized further in that said inlet means and said outlet means communicate with said heat exchange chamber at opposite sides of said shaft means.

4. A rotary joint according to claim 1 and characterized further in that said shaft means includes inner and outer tubular members affixed in concentric relation to one another along said longitudinal end portion of said shaft means, said tubular members defining therebetween at least a main chamber area of said heat exchange chamber.

5. A rotary joint according to claim 4 and characterized further in that said main chamber area extends substantially annularly about said longitudinal end portion of said shaft means.

6. A rotary joint according to claim 4 and characterized further by means for delivering a fluid coolant into said inlet means for cooling said journal means.

7. A rotary joint according to claim 6 and characterized further in that said housing means includes a plurality of exterior cooling fins for increasing the exposed exterior surface area of said housing means for enhanced cooling thereof by ambient air.

8. A rotary joint according to claim 4 and characterized further in that said longitudinal end portion of said shaft means comprises the predominant portion of the length of said shaft means.

9. A rotary joint according to claim 1 and characterized further in that said heat exchange chamber extends substantially annularly about said longitudinal end portion of said shaft means.

10. A rotary joint according to claim 1 and characterized further by means for delivering a fluid coolant into said inlet means for cooling said journal means.

11. A rotary joint according to claim 10 and characterized further in that said housing means includes a plurality of exterior cooling fins for increasing the exposed exterior surface area of said housing means for enhanced cooling thereof by ambient air.

12. A rotary joint according to claim 1 and characterized further in that said longitudinal end portion of said shaft means comprises the predominant portion of the length of said shaft means.

13. A rotary joint for establishing a fluid supply connection between stationary piping and a rotating drum, said rotary joint comprising:
 (a) shaft means adapted to be stationarily mounted exteriorly of said drum at one axial end thereof;
 (b) housing means adapted for affixation in integral rotary relation with said drum; and
 (c) journal means supporting said housing means rotatably about a longitudinal end portion of said shaft means;
 (d) said shaft means having:
  (1) means defining a supply pathway for a working fluid,
  (2) means communicating with said fluid supply pathway for admitting a suply of the working fluid into said fluid supply pathway,
  (3) means defining a heat exchange chamber extending interiorly within said shaft means along at least the predominant length of its said longitudinal end portion, said heat exchange chamber having an access end extending beyond said longitudinal end portion of said shaft means outwardly from said housing means,
  (4) inlet means communicating with said access end of said heat exchange chamber for admitting a supply of a heat exchange fluid into said access end of said heat exchange chamber,
  (5) outlet means communicating with said access end of said heat exchange chamber for exhausting said heat exchange fluid from said access end of said heat exchange chamber, and
  (6) baffle means in said heat exchange chamber for defining a tortuous flow pathway for said heat exchange fluid through said heat exchange chamber between said inlet means and said outlet means for causing said heat exchange fluid to flow longitudinally within said heat exchange chamber at least a substantial portion of its length, to achieve effective heat exchange with respect to said journal means along substantially the full length of said longitudinal end portion of said shaft means for relieving said journal means from any opposing heat exchange effects of the working fluid within said supply pathway.

14. A rotary joint according to claim 13 and characterized further in that said heat exchange chamber defining means defines a main chamber area extending the full length of said heat exchange chamber and defines an exhaust passageway extending from an exhaust location at said access end of said heat exchange chamber out of communication with said main chamber area to an intake location at a longitudinal spacing along said shaft means in communication with said main chamber area, said inlet means being in communication with said main chamber area at said access end of said heat exchange chamber and said outlet means being in communication with said exhaust passageway at said exhaust location thereof.

15. A rotary joint according to claim 14 and characterized further in that said shaft means includes inner and outer tubular members affixed in concentric relation to one another along said longitudinal end portion of said shaft means, said tubular members defining therebetween said main chamber area of said heat exchange chamber and said outer tubular member defining said exhaust passageway interiorly therethrough.

16. A rotary joint according to claim 15 and characterized further in that said main chamber area extends substantially annularly about said longitudinal end portion of said shaft means.

17. A rotary joint according to claim 15 and characterized further by means for delivering a fluid coolant into said inlet means for cooling said journal means.

18. A rotary joint according to claim 17 and characterized further in that said housing means includes a plurality of exterior cooling fins for increasing the exposed exterior surface area of said sleeve means for enhanced cooling thereof by ambient air.

19. A rotary joint according to claim 15 and characterized further in that said lontiduinal end portion of said shaft means comprises the predominant portion of the length of said shaft means.

20. A rotary joint according to claim 14 and characterized further in that said inlet means and said outlet means communicate respectively with said main chamber area and said passageway at opposite sides of said shaft means for causing said heat exchange fluid to flow within substantially the full annular extent of said main chamber area.

21. A rotary joint according to claim 13 and characterized further in that said heat exchange chamber extends substantially annularly about said longitudinal end portion of said shaft means.

22. A rotary joint according to claim 13 and characterized further by means for delivering a fluid coolant into said inlet means for cooling said journal means.

23. A rotary joint according to claim 22 and characterized further in that said housing means includes a plurality of exterior cooling fins for increasing the exposed exterior surface area of said sleeve means for enhanced cooling thereof by ambient air.

24. A rotary joint according to claim 13 and characterized further in that said longitudinal end portion of said shaft means comprises the predominant portion of the length of said shaft means.

25. A rotary joint according to claim 13 and characterized further in that said inlet means and said outlet means communicate with said heat exchange chamber at opposite sides of said shaft means.

26. A rotary joint for establishing fluid supply and fluid exhaust connections between stationary piping and a hollow rotary drum having an axial opening therethrough and an exhaust tube supported coaxially within said axial opening for disposition within said drum, said rotary joint comprising:
 (a) shaft means adapted to be stationarily mounted exteriorly of said drum adjacent said axial opening, said shaft means having a hollow body and a tubular support section extending therefrom to be disposed in facing coaxial relation with said axial opening:

(b) housing means disposed concentrically about a predominant longitudinal end portion of said tubular support section and adapted for affixation rigidly to said drum in integral rotary relation therewith; and (c) journal means disposed intermediate said tubular support section and said housing means for supporting said housing means for relative rotation about said longitudinal end portion of said tubular support section;

(d) said shaft means being characterized further in that:

(1) said body includes means for receiving and supporting said exhaust tube to extend concentrically within said tubular support section, (2) said tubular support section defines an annular supply pathway for a working fluid intermediate said tubular support section and said exhaust tube, (3) said body includes supply fitting means for communicating with said annular fluid supply pathway for admitting a supply of the working fluid into said annular fluid supply pathway and exhaust fitting means for communicating with said exhaust tube for directing a suction force into said exhaust tube, (4) said tubular support section defines a main annular heat exchange chamber area extending interiorly within said tubular support section along substantially the entire length of its longitudinal end portion, said main chamber area having an access region extending beyond said longitudinal end portion axially outwardly from said housing means, and a passageway extending interiorly within said tubular support section from an access location beyond said longitudinal end portion axially outwardly from said housing means out of communication with said main chamber area to a connecting location in communication with said main chamber area at a substantial spacing along the length of said longitudinal end portion of said tubular support section, (5) said shaft means includes inlet means communicating with said access region of said main chamber area for admitting a supply of a heat exchange fluid into said access region of said main chamber area, (6) said shaft means includes outlet means communicating with said access location of said passageway for exhausting said heat exchange fluid from said access location of said passageway, and (7) said main chamber area and said passageway cooperatively defining a tortuous flow pathway for said heat exchange fluid between said inlet means and said outlet means for causing said heat exchange fluid to flow longitudinally within said main chamber area at least a substantial portion of its length and annular extent, to achieve effective heat exchange with respect to said journal means along substantially the full length of said longitudinal end portion of said tubular support section to relieve said journal means from any opposing heat exchange effects from the working fluid within said supply pathway.

27. A rotary joint according to claim 26 and characterized further in that said inlet means and said outlet means communicate respectively with said main chamber area and said passageway at opposite sides of said tubular support section for causing said heat exchange fluid to flow within substantially the full annular extent of said main chamber area.

28. A rotary joint according to claim 27 and characterized further in that said tubular support section of said shaft means includes inner and outer tubular members affixed in concentric relation to one another and defining therebetween said main chamber area, said outer tubular member defining said passageway interiorly therethrough.

29. A rotary joint according to claim 28 and characterized further by means for delivering a fluid coolant into said inlet means for cooling said journal means.

30. A rotary joint according to claim 29 and characterized further in that said housing means includes a plurality of exterior cooling fins for increasing the exposed exterior surface area of said housing means for enhanced cooling thereof by ambient air.

31. A rotary joint according to claim 30 and characterized further in that said exhaust tube receiving means is adapted for rotatably supporting said exhaust tube within said shaft means.

* * * * *

UNITED STATES PATENT OFFICE
CERTIFICATE OF CORRECTION

Patent No. 4,735,262   Dated April 5, 1988

Inventor(s) James C. Lucas

It is certified that error appears in the above-identified patent and that said Letters Patent is hereby corrected as shown below:

Column 1, line 49  Delete "tiones" and insert — tioned —
Column 2, line 65  After "manner" delete "." and insert — , —
Column 4, line  8  Delete "ofthe" and insert — of the —
Column 4, line 28  Delete "flang" and insert — flange —
Column 7, line 20  Delete "throuth" and insert — through —
Column 11, line 3  Delete ":" and insert — ; —

Signed and Sealed this

Twenty-sixth Day of December, 1989

Attest:

JEFFREY M. SAMUELS

*Attesting Officer*   *Acting Commissioner of Patents and Trademarks*